Figures 1, 2:
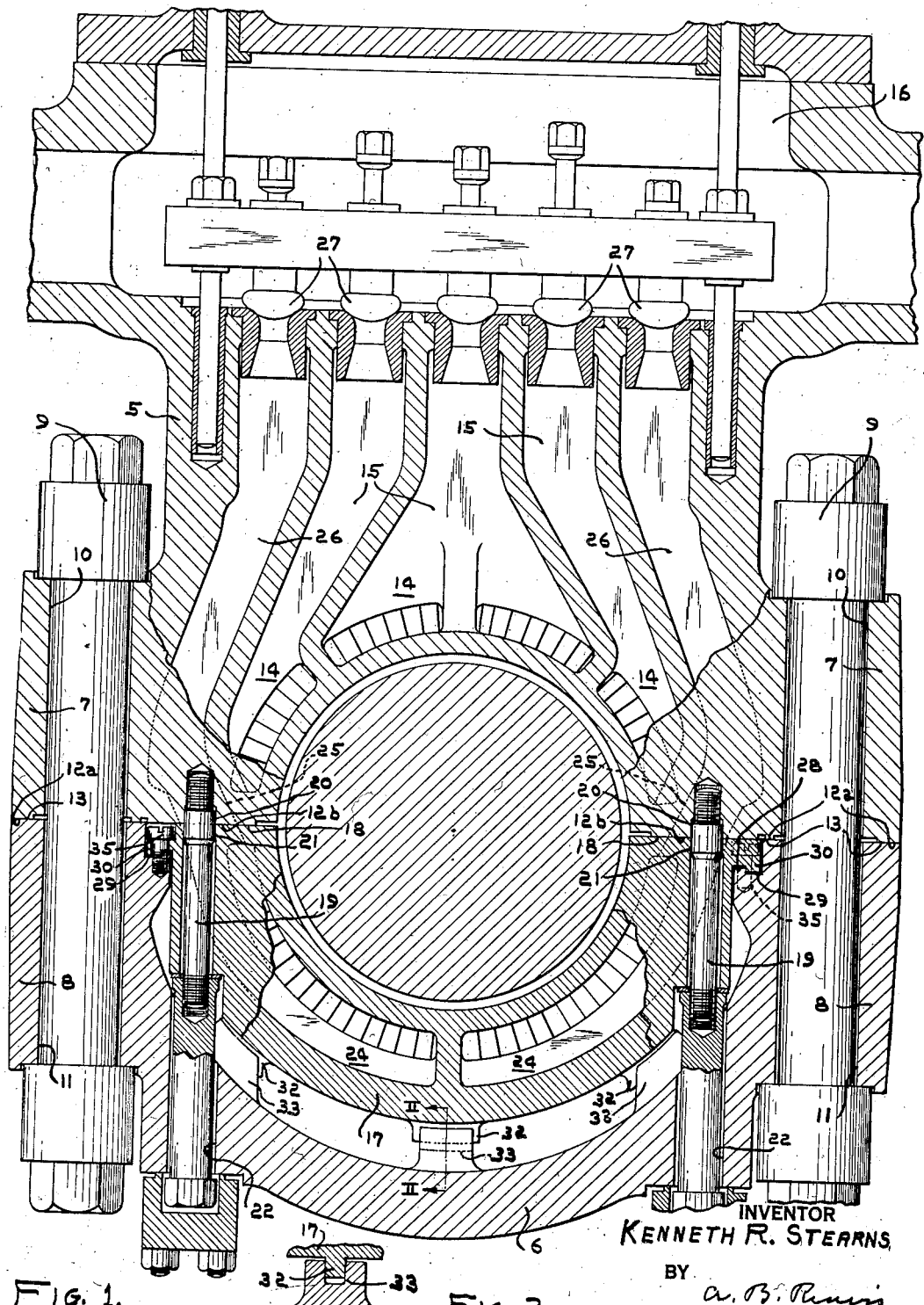

Patented Jan. 19, 1943

2,308,897

UNITED STATES PATENT OFFICE 2,308,897

TURBINE CYLINDER APPARATUS

Kenneth R. Stearns, Springfield, Pa., assignor to Westinghouse Electric & Manufacturing Company, East Pittsburgh, Pa., a corporation of Pennsylvania Application July 10, 1941, Serial No. 401,704

15 Claims. (Cl. 253—39)

The invention relates to elastic fluid turbines and it has for an object to provide a cylinder or housing constructed and arranged so that tightness of the joint may be preserved under variable temperature conditions.

More particularly, the invention relates to an elastic fluid or steam turbine cylinder comprising upper and lower halves connected by bolts and wherein the structure of the cylinder has a plurality of nozzle chambers and passages for supplying motive fluid thereto from a chest, and it has for an object to provide an arcuate member formed separately from the upper and lower cylinder halves, embodying the nozzle chambers and portions of the passages heretofore embodied in the lower cylinder half, and connected to the upper cylinder half by bolts which are independent of the bolts connecting the upper and lower cylinder halves, the construction being advantageous in meeting differential contraction and expansion effects in that the very much greater structural flexibility introduced because of the incorporation of the arcuate member having the lower nozzle chambers makes it possible to maintain the structures of the upper and lower cylinder halves with the joints thereof tight and unaffected to any substantial extent by the structures forming the joints between the arcuate member and the upper cylinder half and vice versa.

These and other objects are effected by the invention as will be apparent from the following description and claims taken in connection with the accompanying drawing forming a part of this application, in which:

Fig. 1 is a transverse sectional view showing the improved cylinder construction; and Fig. 2 is a detail sectional view taken along the line II—II of Fig. 1.

A turbine cylinder comprising upper and lower halves bolted together and having structure thereof formed to provide a steam chest connected by passages to arcuate nozzle chambers has been successfully used for many years. However, to provide the required large steam flows without stressing the blades excessively, it is desirable to have substantially full peripheral admission of steam by forming both the upper and lower cylinder halves with arcuate nozzle chambers and passages for supplying steam thereto, the cored passages for the nozzle chambers of the upper cylinder half being formed entirely within the structure thereof and the passages for supplying the nozzle chambers of the lower half each being formed partly in the upper half and partly in the lower half. The cross-section of the cylinder structure at the nozzle chamber region is, therefore, very deep radially, it is very rigid, and it is subject to rapid change in temperature because large and variable areas of its surface are exposed to dense and rapidly flowing steam. Even though extremely heavy bolting is used, the consequent temperature-gradient distortions tend to rotate the horizontal joint contact surfaces relatively to each other enough to cause serious leakage in many high temperature turbines, particularly during periods of rapidly changing load or inlet temperature. With increase in temperature in the nozzle chambers and passages, the tangential fibres in the adjacent inner parts of the cross-section elongate quicker than those in the outer parts of the latter, and, in consequence, the outer edge portions of the joints are forced apart. On the other hand, if the inner fibres become cooler than the outer ones, then the outer portions of the joints remain in contact and the decreasing radius of curvature of the section causes the inner portions to open.

The improved structure reduces the pull required for the horizontal joint bolts to prevent relative rotation of the joint faces, and, at the same time, it preserves desirable features of the prior integral steam chest and nozzle chamber design. The improvement resides in providing a structure separate from the lower cylinder half and having incorporated therein the nozzle chambers and passages heretofore formed in the latter. The separate member or structure carries the nozzle block and it may be arranged to accommodate a ring to hold the lower half of the stationary row of reversing blades where the construction is used for Curtis stage.

The member having the lower nozzle chambers is substantially semi-circular. It is mounted in such a manner and connected to the upper cylinder half so as to avoid the transmission of radial or tangential forces or tangential bending moments to the joint through the lower cylinder half, and yet it is held closely in position during operation, dismantling, and assembly of the turbine. The portion of the lower cylinder half between the horizontal joint flanges thus becomes a simple shell having a rigidity resisting tangential bending very much less than former value, for example, it may be of the order of ½₀ of the former value. The cylinder cover may follow previous designs. Whatever angle its contact surfaces may assume under temperature gradients, a comparatively small bolt pull suffices to bend the lower cylinder half or shell enough to maintain contact of the joint surfaces both inside and outside of the main joint bolts.

Referring now to the drawing more in detail, there is shown a turbine cylinder including upper and lower halves 5 and 6 having the usual flanges 7 and 8 held together by main bolts 9 in the registering openings 10 and 11. The upper cylinder half has outer and inner joint faces 12a and 12b, the faces or surfaces 12a engaging the joint faces 13 of the lower cylinder half.

The upper cylinder half 5 is formed, as by casting, to provide a plurality of arcuate nozzle chambers 14 supplied with elastic fluid or steam by the passages 15 from the chest 16.

An arcuate or semi-circular member 17 has end joint faces 18 normally held in steam-tight engagement with the inner joint faces 12b by means of stud bolts 19 cooperating with registering openings 20 and 21 formed in the upper cylinder half and in the member. The lower cylinder half has openings 22 providing access to the bolts or screws 19 in order that the latter may be manipulated with the upper cylinder half in place. The member is formed to provide nozzle chambers 24 and ports or passage portions 25 of steam passages for supplying steam thereto, the steam passage portions 25 registering with steam passages 26 formed in the upper cylinder half and communicating with the steam chest.

As is customary, the chest 16 contains a plurality of valves 27 for controlling the flow of motive fluid through the passages to the nozzle chambers 14 and 24.

The lower cylinder half 6 has seats 28 for terminal portions of the arcuate or semi-circular member 17. The seats and the terminal portions have means, for example, the cooperating grooves 29 and tongues 30 to hold the arcuate member in relation to the lower cylinder half, not only to facilitate its machining, in connection with the lower cylinder half, but also to insure approximate radial registry of the stud bolt openings 20 and 21 when the upper cylinder half is being reassembled even though the separate nozzle chamber member has become warped. As shown, the cooperating tongues and grooves 29 and 30 have sufficient clearance in all directions to avoid pressure being exerted on the lower cylinder half when the stud bolts 19 are in place.

Between its supports, the intervening portion of the semi-circular member 17 is radially free with respect to the interior wall of the lower half of the cylinder and means, for example, cooperating tongue and groove elements 32 and 33, are used to limit its axial displacement, the tongue and groove having sufficient radial clearance to provide independent relative radial movements of the arcuate or semi-circular member and the lower cylinder half.

The dowel screws or bolts 19 are normally carried by the upper cylinder half when the latter is removed; and, to prevent friction of such bolts with respect to the arcuate member 17 from causing the latter to be lifted against the spindle, the member is preferably held in place with respect to the lower cylinder half by means of shouldered retaining screws 35 which have sufficient clearance to avoid contact under the heads during normal operation.

As the flow along the nozzle chambers 24 progressively diminishes due to discharge through nozzle passages, each chamber preferably converges or tapers in the direction of flow, thereby providing for increased flexibility of the arcuate member and consequent lower stresses in the stud bolts 19 due to temperature differences in the upper cylinder half 5 and the arcuate member 17.

From the foregoing, it will be apparent that there has been provided a turbine cylinder which is radially thickened so that a circumferential arrangement of nozzle chambers and passages for supplying elastic fluid thereto from a chest may be incorporated within or be defined by the structure thereof without the disadvantage of opening up of joints due to differential expansion and contraction incident to rapid changes in temperature, the achievement of this result being made possible by the use, with the upper cylinder half, as heretofore built, of a composite lower half comprising the lower cylinder half proper and a structurally separate arcuate member formed with the lower nozzle chambers and passages for supplying elastic fluid thereto, the arcuate member having end joint faces engaging the inner portions of the joint faces of the upper cylinder half and the lower cylinder half having joint faces engaging the outer portions of the joint faces of the upper cylinder half. As the radial thickness of the lower half of the cylinder at the nozzle chamber zone is thereby substantially reduced, its flexibility is increased, enabling the main bolts 9 and the lower cylinder half contact surfaces 13 to follow rotations of the upper cylinder half or cover outer joint faces 12a. Not only are expansion and contraction forces of the arcuate nozzle chamber member 17 entirely isolated from the main cylinder horizontal joint, but such member has enough flexibility to permit of its joint faces being held in fluid-tight engagement with the inner joint faces 12b by the stud bolts 19, irrespective of relative turning or angular displacement of the joint faces 12a and 12b of the upper cylinder half. Reduction in radial depth of the lower cylinder half results in reduced temperature gradients and the small or radial dimension or the contact surface at the main cylinder joint reduces the lever arm of the local hot, and therefore, high spots on the main bolting. By having the lower nozzle chambers and supply passages formed in a member which is separate from the lower cylinder half, the latter is protected from all contact with hot motive fluid.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a turbine, a cylinder including upper and lower halves, an arcuate member, means for joining the upper and lower cylinder halves and for joining the ends of the arcuate member to the upper cylinder half, a circumferential series of nozzle chambers formed in the upper cylinder half and in the arcuate member, passages formed in the upper cylinder half for supplying eleastic fluid to the nozzle chambers formed in the latter, and communicating passages formed in the upper cylinder half and in the arcuate member for supplying elastic fluid to the nozzle chambers formed in the latter.

2. In a turbine, a cylinder including upper and lower halves, an arcuate member separate from and within the lower cylinder half, said upper and lower cylinder halves and the member having joint faces, bolts for connecting the upper and lower cylinder halves and for connecting the arcuate member and the upper cylinder half with the joint faces engaged, and nozzle chambers and passages for supplying elastic fluid thereto formed in the upper cylinder half and in the arcuate member.

3. In a turbine, a cylinder including upper and lower halves, an arcuate member separate from and within the lower cylinder half, said upper and lower cylinder halves and the ends of the arcuate member having joint faces, bolts for connecting the upper and lower cylinder halves and for connecting the upper cylinder half and the arcuate member with the joint faces engaged, nozzle chambers formed in the upper cylinder half and in said arcuate member, and first and second passages for supplying elastic fluid to the nozzle chambers, the first passages being formed entirely in the upper cylinder half and the second passages being formed partly in the upper cylinder half and partly in the arcuate member and intersecting the cooperating joint faces thereof.

4. In a turbine, a cylinder including upper and lower halves, an arcuate member separate from and within the lower cylinder half, said upper and lower cylinder halves and the upper cylinder half and the arcuate member having registering bolt openings, bolts cooperating with the registering openings for joining the upper and lower cylinder halves and for joining the upper cylinder half and said member, means for supporting the arcuate member in relation to the lower cylinder half so as to insure registry of the bolt openings in the member with bolt openings in the upper cylinder half when the upper cylinder half is brought into position with bolt openings thereof registering with the bolt openings of the lower cylinder half, and nozzle chambers and passages for supplying elastic fluid thereto formed in the upper cylinder half and in the arcuate member.

5. In a turbine, a cylinder including upper and lower halves, an arcuate member separate from and within the lower cylinder half, bolts for joining the upper and lower cylinder halves and for joining the upper cylinder half and said member, seats for supporting terminal portions of said arcuate member from the lower cylinder half so that the intervening portion of the member is radially free of the interior wall of the latter, means provided on the interior of the lower cylinder half and on the intervening portion of the arcuate member for limiting displacement of the latter axially of the lower cylinder half, and nozzle chambers and passages for supplying elastic fluid thereto formed in the upper cylinder half and in the arcuate member.

6. In a turbine, a cylinder having upper and lower halves, an arcuate member structurally separate from and within the lower cylinder half, bolts for joining the cylinder halves and for joining the ends of the arcuate member to the upper half, means providing for the lower cylinder half retaining the arcuate member when the upper cylinder half is removed, and nozzle chambers and passages for supplying elastic fluid thereto formed in the upper cylinder half and in the arcuate member.

7. In a turbine, a cylinder including upper and lower halves, an arcuate member structurally separate from and within the lower cylinder half, bolts for joining the upper and lower cylinder halves and for joining the upper cylinder half and said member, seats for supporting terminal portions of the arcuate member from the lower cylinder half so that the intervening portion of the member is radially free of the interior wall of the latter, means provided on the interior of the lower cylinder half and on the intervening portion of the arcuate member for limiting displacement of the latter axially of the lower cylinder half, means providing for the lower cylinder half retaining the arcuate member when the upper cylinder half is removed, and nozzle chambers and passages for supplying elastic fluid thereto formed in the upper cylinder half and in the arcuate member.

8. In a turbine, a cylinder including upper and lower halves, an arcuate member structurally separate from and within the lower cylinder half, said upper and lower cylinder halves and the upper cylinder half and the arcuate member having registering bolt openings, bolts cooperating with the registering openings for joining the upper and lower cylinder halves and for joining the upper cylinder half and said member, seats for supporting terminal portions of said arcuate member from the lower cylinder half so that the intervening portion of the member is radially free of the interior wall of the latter, means provided on the interior of the lower cylinder half and on the intervening portion of the arcuate member for limiting displacement of the latter axially of the lower cylinder half, means providing for the lower cylinder half holding the terminal portions of the arcuate member so as to insure registry of the bolt openings of the latter with bolt openings in the upper cylinder half when the upper cylinder half is brought into position with bolt openings thereof registering with the bolt openings of the lower cylinder half, and nozzle chambers and passages for supplying elastic fluid thereto formed in the upper cylinder half and in the arcuate member.

9. The combination as claimed in claim 8 with means providing for the lower cylinder half retaining the arcuate member when the upper cylinder half is removed.

10. In a turbine, a cylinder including upper and lower halves, an arcuate member structurally separate from and within the lower cylinder half, said upper and lower cylinder halves and the ends of the arcuate member having joint faces, bolts for connecting the upper and lower cylinder halves and for connecting the upper cylinder half and the arcuate member with the joint faces engaged, seats for supporting the terminal portions of said arcuate member from the lower cylinder half so that the intervening portion of the member is radially free of the interior wall of the latter, means provided on the interior of the lower cylinder half and on the intervening portion of the arcuate member for limiting displacement of the latter axially of the lower cylinder half, means providing for the lower cylinder half holding the arcuate member so as to insure registry of the bolt openings thereof with bolt openings in the upper cylinder half when the upper cylinder is brought into position with bolt openings thereof registering with the bolt openings of the lower cylinder half, means providing for the lower cylinder half retaining the arcuate member when the upper cylinder half is removed, nozzle chambers formed in the upper cylinder half and in the arcuate member, and first and second passages for supplying elastic fluid to the nozzle chambers, the first passages being formed entirely in the upper cylinder half and the second passages being formed partly in the upper cylinder half and partly in the arcuate member and intersecting the cooperating joint faces thereof.

11. In a turbine, a cylinder including upper and lower halves, said upper half having a radial thickened portion, an arcuate member structurally separate from and cooperating with the lower half to provide a composite radial thickened portion aligned with the first thickened portion, means for connecting the upper and lower cylinder halves, means for connecting the arcuate member to the upper cylinder half, and nozzle chambers and passages for supplying elastic fluid thereto formed in the thickened portion of the upper cylinder half and in the arcuate member.

12. In a turbine, a cylinder including upper and lower cylinder halves having joint faces; said upper cylinder half having an inwardly-extending thickened portion; an arcuate member within, structurally separate from, and cooperating with the lower cylinder half to provide a composite inwardly-extending thickened portion aligned with the first thickened portion; said arcuate member and the upper cylinder half having joint faces; means for supporting the arcuate member from the lower cylinder half; bolts for connecting the upper and lower cylinder halves and for connecting the arcuate member to the upper cylinder half; and nozzle chambers and passages for supplying elastic fluid thereto formed in the thickened portion of the upper cylinder half and in the arcuate member.

13. In a turbine, a cylinder including upper and lower cylinder halves having joint faces; said upper cylinder half having an inwardly-extending thickened portion; an arcuate member within, structurally separate from, and cooperating with the lower cylinder half to provide a composite inwardly-extending thickened portion aligned with the first thickened portion; said arcuate member and the upper cylinder half having joint faces, means for supporting the end portions of the arcuate member from the lower cylinder half so that the intervening portion of such member is radially free with respect to the interior wall of the lower cylinder half, bolts for connecting the upper and lower cylinder halves and for connecting the arcuate member to the upper cylinder half, and nozzle chambers and passages for supplying elastic fluid thereto formed in the thickened portion of the upper cylinder half and in the arcuate member.

14. In a turbine, a cylinder including upper and lower cylinder halves having joint faces; said upper cylinder half having an inwardly-extending thickened portion; an arcuate member within, structurally separate from, and cooperating with the lower cylinder half to provide a composite inwardly-extending thickened portion aligned with the first thickened portion; said arcuate member and the upper cylinder half having joint faces; the upper and lower cylinder halves and the upper cylinder half and the arcuate member having registering bolt openings; means providing for the lower cylinder half holding the arcuate member so that its bolt openings register with bolt openings in the upper cylinder half when the latter is brought into position with bolt openings thereof registering with the bolt openings of the lower cylinder half; bolts cooperating with the registering openings for connecting the upper and lower cylinder halves and for connecting the arcuate member to the upper cylinder half; and nozzle chambers and passages for supplying elastic fluid thereto formed in the thickened portion of the upper cylinder half and in the arcuate member.

15. In a turbine, a cylinder including upper and lower halves having joint faces; said upper half having an inwardly-extending thickened portion; an arcuate member within, structurally separate from, and cooperating with the lower cylinder half to provide a composite inwardly-extending thickened portion aligned with the first thickened portion; said arcuate member and the upper cylinder half having joint faces; means providing for the lower cylinder half supporting the end portions of the arcuate member so that the intervening portion thereof is radially free with respect to the interior wall of the lower cylinder half; the upper and lower cylinder halves and the upper cylinder half and the arcute member having registering bolt openings; means providing for the lower cylinder half holding the end portions of the arcuate member so that the bolt openings thereof register with bolt openings of the upper cylinder half when the latter is brought into position with bolt openings thereof registering with the bolt openings of the lower cylinder half; means for limiting the relative displacement of said intervening portion of the arcuate member and of the lower cylinder half in an axial direction; means providing for the lower cylinder half retaining the arcuate member when the upper cylinder half is removed; bolts cooperating with the registering openings to join the upper and lower cylinder halves and to join the ends of the arcuate member to the upper cylinder half; and nozzle chambers and passages for supplying elastic fluid thereto formed in the thickened portion of the upper cylinder half and in the arcuate member.

KENNETH R. STEARNS.